United States Patent
Srivastava et al.

(10) Patent No.: US 8,211,334 B2
(45) Date of Patent: Jul. 3, 2012

(54) ORANGE-RED PERSISTENT PHOSPHORS

(75) Inventors: Alok Mani Srivastava, Niskayuna, NY (US); Holly Ann Comanzo, Niskayuna, NY (US); Claire Susan Henderson, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 435 days.

(21) Appl. No.: 12/606,237

(22) Filed: Oct. 27, 2009

(65) Prior Publication Data
US 2011/0095676 A1    Apr. 28, 2011

(51) Int. Cl.
*C09K 11/54* (2006.01)
*C09K 11/55* (2006.01)
*C09K 11/56* (2006.01)
*C09K 11/61* (2006.01)
*C09K 11/62* (2006.01)
*C09K 11/64* (2006.01)

(52) U.S. Cl. ..... 252/301.4 H; 252/301.4 S; 252/301.36; 252/301.6 S; 252/301.6 R

(58) Field of Classification Search ............ 252/301.4 S, 252/301.6 S, 301.36, 301.4 H, 301.6 R
See application file for complete search history.

(56) References Cited

U.S. PATENT DOCUMENTS

| | | | |
|---|---|---|---|
| 6,117,362 A | 9/2000 | Yen et al. | |
| 6,953,536 B2 | 10/2005 | Yen et al. | |
| 8,026,659 B2 * | 9/2011 | Tang et al. | 313/501 |

FOREIGN PATENT DOCUMENTS

GB    766043    1/1957

OTHER PUBLICATIONS

Song et al., "Sr3Al2O5Cl2: Ce3+, Eu2+: A Potential Tunable Yellow-to-White-Emitting Phosphor for Ultraviolet Light Emitting Diodes", Applied Physics Letters, vol. 94, pp. 091902-1-09192-3, 2009.
Tang et al., "Near-Ultraviolet Excitable Orange-Yellow Sr3(Al2O5)Cl2: Ce2+, Eu2+: Phosphor for Potential Application in Light-Emitting Diodes", Applied Physics Letters, vol. 93, pp. 131114-1-131114-3, 2008.

* cited by examiner

*Primary Examiner* — Carol M Koslow
(74) *Attorney, Agent, or Firm* — Mary Louise Gioeni

(57) ABSTRACT

Orange-red phosphors activated by europium and rare earth ions of formula I and formula II are long persistent, stable, and non-toxic $$M^1F_2\text{-}M^1S: Eu^{2+}, Ln^{3+} \quad (I)$$

$$M^2{}_3M^3{}_2O_5X_2: \text{inside or outside } Eu^{2+}, Ln^{3+} \quad (II)$$

wherein
$M^1$ is Ba, Sr, Ca, Zn, Mg, or a combination thereof;
$M^2$ is Ba, Sr, Ca, Mg, Zn, or a combination thereof;
$M^3$ is Al, Ga, B, In, or a combination thereof;
X is F, Cl, Br, I, or a combination thereof; and
Ln is Dy, Yb, Tm, Er, Ho, Sm, Nd, or a combination thereof.

26 Claims, 1 Drawing Sheet

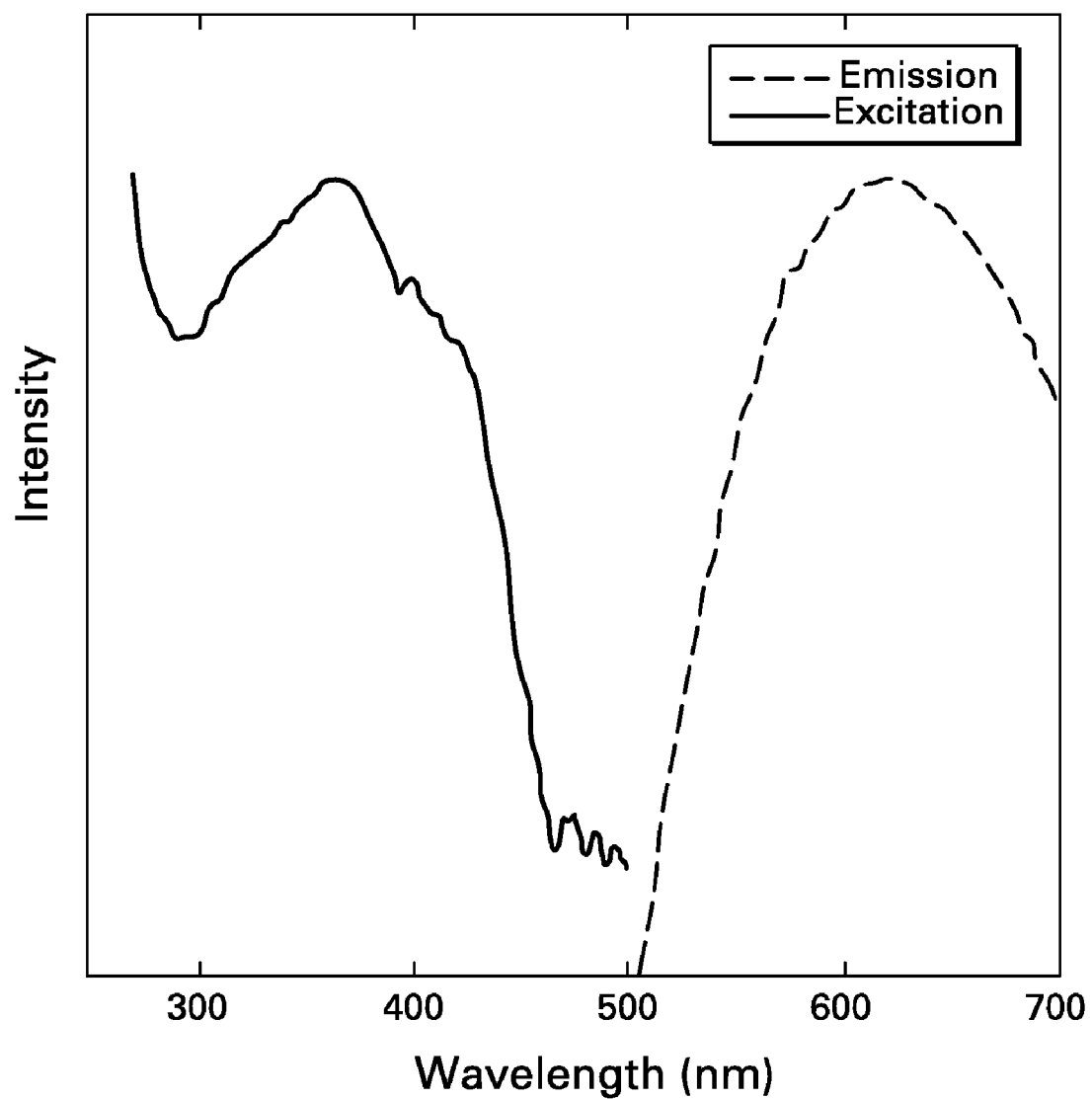

ORANGE-RED PERSISTENT PHOSPHORS

BACKGROUND

Persistently phosphorescent materials such as ZnS:Cu, CaS:Eu, Tm, ZnS:Cu, Co, ZnCdS:Cu and CaSrS:Bi have been used for many years. These materials have been used in various applications, including paints, inks, and polymers and resins, for manufacturing consumer products such as toys, jewelry, ornaments, pens, pencils and crayons, and safety signage, including emergency egress pathway marking systems, and safety equipment. Recently, a much brighter and longer persistent green phosphor, $SrAl_2O_4$: $Eu^{2+}$, $Dy^{3+}$ has been developed, having a persistent afterglow emission or phosphorescence which can last for up to ten or more hours following a relatively brief period of ultraviolet excitation. However, phosphors emitting in the red to yellow range have been of low persistence, chemically unstable and/or toxic. Therefore, there is a need for new phosphors that may be used to produce longer persistent, stable, non-toxic persistent phosphor compositions emitting in the red to yellow region.

BRIEF DESCRIPTION

In one aspect, the present invention relates to long persistent phosphors activated by europium and rare earth ions. The phosphors are selected from phosphors of formula I and phosphors of formula II;

$$M^1F_2\text{-}M^1S: Eu^{2+}, Ln^{3+} \quad (I)$$

$$M^2_3M^3_2O_5X_2: Eu^{2+}, Ln^{3+} \quad (II)$$

wherein
$M^1$ is Ba, Sr, Ca, Zn, Mg, or a combination thereof;
$M^2$ is Ba, Sr, Ca, Mg, Zn, or a combination thereof;
$M^3$ is Al, Ga, B, In, or a combination thereof;
X is F, Cl, Br, I, or a combination thereof; and
Ln is Dy, Yb, Tm, Er, Ho, Sm, Nd, or a combination thereof.

In another aspect, the present invention relates to polymer compositions comprising at least one long persistent phosphor of formula I or II, or a combination thereof.

Preferred phosphors of the present invention are chemically stable, resistant to moisture, and to UV radiation. The phosphors of formula I and II are believed to be relatively harmless to the environment

DRAWINGS

These and other features, aspects, and advantages of the present invention will become better understood when the following detailed description is read with reference to the accompanying drawings in which like characters represent like parts throughout the drawings, wherein:

FIG. 1 is a graph showing excitation and emission spectra for an orange-red phosphor according to the present invention.

DETAILED DESCRIPTION

Persistence time is the time, after discontinuing irradiation, that it takes for phosphorescence of a sample to decrease to the threshold of eye sensitivity. This threshold is the signal level of emission intensity that a naked (i.e., unaided) eye can clearly see in the dark. Persistence times are assessed by measuring phosphorescence intensity as a function of time. As used herein, "long persistent phosphor" refers to materials having persistence times exceeding 2 hours. The persistence time of phosphors of formula I and II may exceed two or more hours. It is generally the case that phosphors having longer persistence times are more preferred. Phosphors of formula I and II may exhibit phosphorescence persistence times of greater than about two hours.

In certain embodiments, the phosphors of formula II are $Sr_3M^{3+}_2O_5X_2$: $Eu^{2+}$, $Dy^{3+}$ or $M^2_3Al^3_2O_5X_2$: $Eu^{2+}$, $Dy^{3+}$, and more particularly, $Sr_3Al_2O_5Cl_2$: $Eu^{2+}$, $Dy^{3+}$. One embodiment of the phosphors of formula I is $SrF_2$—$SrS$: $Eu^{2+}$, $Dy^{3+}$.

FIG. 1 shows emission and excitation spectra of an orange phosphor of formula II, $Sr_3Al_2O_5Cl_2$: $Eu^{2+}$, $Dy^{3+}$. The peak of the excitation curve is at about 340 nm, and light from sources that have emission in this region, such as sunlight or fluorescent lights, may charge the phosphor. As the phosphor is charged, energy is transferred to the activation sites where it is retained by ions in the excited state for long periods of time prior to those ions losing the energy through the emission of a photon. The peak of the emission curve is at about 630 nanometers, which is in the orange region of the spectrum. Phosphors of formula I and II may be red, orange, yellow, or somewhere in between, or may be of other colors.

Phosphors of formula I and II may be produced using known solid state reaction processes for the production of phosphors by combining, for example, elemental halides, elemental oxides, carbonates and/or hydroxides as starting materials. Other starting materials may include nitrates, sulfates, acetates, citrates, or oxalates. Alternately, coprecipitates of the rare earth oxides may be used as the starting materials for the rare earth elements.

In a typical process, the starting materials are combined via a dry blending process and fired in air or under a reducing atmosphere at from, e.g., 1000 to 1600° C. A fluxing agent may be added to the mixture before or during the step of mixing. This fluxing agent may be $AlF_3$, $NH_4Cl$ or any other conventional fluxing agent, such as a fluorides or chlorides of aluminum, gallium, indium, calcium or magnesium, or a mixture thereof. A quantity of a fluxing agent of less than about 20, preferably less than about 10, percent by weight of the total weight of the mixture is adequate for fluxing purposes.

The starting materials may be mixed together by any mechanical method including, but not limited to, stirring or blending in a high-speed blender or a ribbon blender. The starting materials may be combined and pulverized together in a bowl mill, a hammer mill, or a jet mill.

The firing may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. Typically, a firing time up to about 10 hours is adequate. The reducing atmosphere typically comprises a reducing gas such as hydrogen, carbon monoxide, or a combination thereof, optionally diluted with an inert gas, such as nitrogen or helium, or a combination thereof. Alternatively, the crucible containing the mixture may be packed in a second closed crucible containing high-purity carbon particles and fired in air so that the carbon particles react with the oxygen present in air, thereby, generating carbon monoxide for providing a reducing atmosphere.

The phosphors of formula I and II may contain optically inert trace impurities including, for example, strontium silicates and strontium aluminum silicates. The presence of such impurities in an amount up to 10% by weight of the phosphor composition will not significantly affect the quantum efficiency or color of the phosphor.

While suitable in many applications alone, the phosphors of formula I and II may be blended with each other, and one or more additional phosphors for use in any applications. Thus, in another aspect, the present invention relates to a blend of a phosphor of formula I or II with one or more additional phosphors. When used in combination phosphors of other colors, the color of the light emitted by the blend may be tuned as desired by adjusting the relative amounts of the phosphors of different colors.

In general, the phosphors of formula I and II have a variety of applications for the manufacture of luminous materials such as paints, inks, plastics, resins, ceramics and glasses. These materials may be used in novelty articles such as toys, jewelry, ornaments, writing implements, and apparel. The phosphors may be also used in any application requiring long term light emission in locations that have no energy source for powered lighting, particularly for lighting and signage in security, safety, and emergency egress applications.

The phosphors of formula I and II may be used in the manufacture of phosphorescent articles which incorporate the phosphors into a suitable matrix. The phosphorescence of the phosphor of formula I and II is typically not affected when the phosphor is dispersed in a matrix which does not substantially react with the phosphor (e.g. enamels, waxes, varnishes, paints, and polymers). Material for use in such a matrix include thermoplastic and thermosetting materials with sufficient translucency to allow light transfer through thin layers. Exemplary thermoplastic materials include, but are not limited to, vinyl, PVC, polystyrene, high impact polystyrene (HIPS), styrene-butadiene copolymers, polycarbonate, polyethylene, polyurethane, polyethylene terephthalate (PET), polyethylene terephthalate glycol (PETG), and polypropylene, among others. Exemplary thermoset materials include such compounds as silicon room temperature vulcanized (RTV) compounds and epoxies, among others. In embodiments, the phosphors are incorporated into the thermoset resins by mixing the phosphor with one of the two reactant portions. Further, the matrix does not need to be plastic. One of ordinary skill in the art will recognize that the phosphors of formula I and II may be incorporated into glass or ceramic matrices as well.

The phosphors of formula I and II may be incorporated into numerous products used in low light applications, for example, the front faceplate of a car radio, or in the controls attached to the faceplate. Additionally, the low toxicity of the phosphors of formula I and II makes applications such as toys and other commercial or consumer goods a possibility. Furthermore, the long persistence of the phosphors of formula I and II makes them useful for applications in safety apparel, such as hard hats, where the phosphors may be incorporated into the body or into stickers or decals applied to the side, or safety clothing with lettering, where the phosphor may be incorporated either in fibers making up the fabric of clothing or into the lettering.

The phosphors of formula I and II may also be used in safety signage and tape to form informational icons, such as directional arrows, pictograms, or text, when the phosphorescent material becomes the dominant light source upon the removal of ambient light. Thus, the informational icons begin to perceptually "glow" (luminesce) automatically upon failure of the ambient lighting system. The icons may be of a visually simple form, such as directional arrows guiding persons in the proper direction to access to the nearest emergency exit. Alternatively, or additionally, informational icons of such type can be deployed to point out important information, such as emergency evacuation information and directions, the location of fire extinguishers and electrical equipment, personal safety information, and location of life rafts, first-aid kits, communications terminals, or other emergency equipment. The phosphorescent material may also be used to demarcate the outlines and intersections of building structures, such as walls, stairs, etc. Informational icons may be formed in the text of any written language(s), or alternatively may be multi-lingual in character. Alternatively, or additionally, the informational icons may include any of the international standard pictograms, which convey information entirely through outline/area, and do not rely on color or text. Any of the aforementioned informational icons may be formed in a "positive" or "negative" manner, i.e., the icon can be defined by the presence of phosphorescent material against a background void of photoluminescence, or the icon can be defined by the absence of photoluminescence against a background containing the phosphorescent material.

The phosphors of formula I and II may be also be used in lighting systems for emergency egress. Such lighting systems can be used to provide lighting in stairwells, fire escapes, hallways, exits, and elevators and provide sufficient light in the event of a power failure to allow for safe and orderly exit from dark areas. The lighting systems include a light source and at least one phosphor of formula I or II radiationally coupled to the light source. Radiationally coupled means that the elements are associated with each other so radiation from one is transmitted to the other. Suitable light sources include, but are not limited to, fluorescent tubes, compact fluorescent lamps, LED lamps, and incandescent bulbs. The phosphor may be in direct contact with the light source, or may be physically separated from it, but positioned so that light of sufficient energy falls on the phosphor cause excitation. Thus, the phosphor may be coated over or directly on the light emitting surface of the light source by coating and drying a suspension of the phosphor. The surface on which the phosphor is disposed is typically transparent to allow white light to be transmitted through it. Although not intended to be limiting, in one embodiment, the median particle size of the phosphor may range from about 1 to about 20 microns. In a non-limiting example, the phosphors of formula I and II may be coated onto a surface of a fluorescent tube. The phosphors may be coated on the inside or outside surface of the tube. The phosphor of formula I and II may be coated on the entire inside or outside surface of the tube or on only a bottom portion of the inside or outside surface. In another example, the phosphors may be contained in a film formed into a sleeve surrounding the fluorescent tube.

The applications above are but a few examples of embodiments of formula I and II and are not intended to limit its application to those uses. Those skilled in the art will recognize that a long lived persistent phosphor may be useful in a large variety of applications beyond the ones listed above. For example, the material may be used as a phosphor in a cathode ray tube, in a plasma display device, in a liquid crystal display (LCD). The phosphors may also be used in a LED lamp or fluorescent lamp to produce white light, having a desired correlated color temperature (CCT) and color rendering index (CRI). These uses are meant to be merely exemplary and not exhaustive.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A phosphor activated by europium and rare earth ions, said phosphor selected from phosphors of formula I and phosphors of formula II;

$$M^1F_2-M^1S: Eu^{2+}, Ln^{3+} \quad (I)$$

$$M^2{}_3M^3{}_2O_5X_2: Eu^{2+}, Ln^{3+} \quad (II)$$

wherein
$M^1$ is Ba, Sr, Ca, Zn, Mg, or a combination thereof;
$M^2$ is Ba, Sr, Ca, Mg, Zn, or a combination thereof;
$M^3$ is Al, Ga, B, In, or a combination thereof;
X is F, Cl, Br, I, or a combination thereof; and
Ln is Dy, Yb, Tm, Er, Ho, Sm, Nd, or a combination thereof.

2. A phosphor according to claim 1, of formula I $$M^1F_2-M^1S: Eu^{2+}, Dy^{3+} \quad (I).$$

3. A phosphor according to claim 1, of formula II $$M^2{}_3M^3{}_2O_5X_2: Eu^{2+}, Dy^{3+} \quad (II).$$

4. A phosphor according to claim 1, of formula II $$Sr_3M^3{}_2O_5X_2: Eu^{2+}, Dy^{3+} \quad (II).$$

5. A phosphor according to claim 1, of formula II $$M^2{}_3Al^3{}_2O_5X_2: Eu^{2+}, Dy^{3+} \quad (II).$$

6. A phosphor according to claim 1, of formula $$SrF_2-SrS: Eu^{2+}, Dy^{3+}.$$

7. A phosphor according to claim 1, of formula $$Sr_3Al_2O_5Cl_2: Eu^{2+}, Dy^{3+}.$$

8. A composition comprising a phosphor of formula I or II, dispersed in a polymer matrix;

$$M^1F_2-M^1S: Eu^{2+}, Ln^{3+} \quad (I)$$

$$M^2{}_3M^3{}_2O_5X_2: Eu^{2+}, Ln^{3+} \quad (II)$$

wherein
$M^1$ is Ba, Sr, Ca, Zn, Mg, or a combination thereof;
$M^2$ is Ba, Sr, Ca, Mg, Zn, or a combination thereof;
$M^3$ is Al, Ga, B, In, or a combination thereof;
X is F, Cl, Br, I, or a combination thereof; and
Ln is Dy, Yb, Tm, Er, Ho, Sm, Nd, or a combination thereof.

9. A composition according to claim 8, wherein the phosphor is of formula I $$M^1F_2-M^1S: Eu^{2+}, Dy^{3+} \quad (I).$$

10. A composition according to claim 8, wherein the phosphor is of formula II $$M^2{}_3M^3{}_2O_5X_2: Eu^{2+}, Dy^{3+} \quad (II).$$

11. A composition according to claim 8, wherein the phosphor is of formula $$Sr_3M^3{}_2O_5X_2: Eu^{2+}, Dy^{3+}.$$

12. A composition according to claim 8, wherein the phosphor is of formula $$M^2{}_3Al_2O_5X_2: Eu^{2+}, Dy^{3+}.$$

13. A composition according to claim 8, wherein the phosphor is of formula $$SrF_2-SrS: Eu^{2+}, Dy^{3+}.$$

14. A composition according to claim 8, wherein the phosphor is of formula $$Sr_3Al_2O_5Cl_2: Eu^{2+}, Dy^{3+}$$

15. A lighting apparatus comprising a light source and a phosphor of formula I or II radiationally coupled to the light source $$M^1F_2-M^1S: Eu^{2+}, Ln^{3+} \quad (I)$$

$$M^2{}_3M^3{}_2O_5X_2: Eu^{2+}, Ln^{3+} \quad (II)$$

wherein
$M^1$ is Ba, Sr, Ca, Zn, Mg, or a combination thereof;
$M^2$ is Ba, Sr, Ca, Mg, Zn, or a combination thereof;
$M^3$ is Al, Ga, B, In, or a combination thereof;
X is F, Cl, Br, I, or a combination thereof; and
Ln is Dy, Yb, Tm, Er, Ho, Sm, Nd, or a combination thereof.

16. A lighting system according to claim 15, wherein the phosphor is of formula I $$M^1F_2-M^1S: Eu^{2+}, Dy^{3+} \quad (I).$$

17. A lighting system according to claim 15, wherein the phosphor is of formula II $$M^2{}_3M^3{}_2O_5X_2: Eu^{2+}, Dy^{3+} \quad (II).$$

18. A lighting system according to claim 15, wherein the phosphor is of formula $$Sr_3M^3{}_2O_5X_2: Eu^{2+}, Dy^{3+}.$$

19. A lighting system according to claim 15, wherein the phosphor is of formula $$M^2{}_3Al_2O_5X_2: Eu^{2+}, Dy^{3+}.$$

20. A lighting system according to claim 15, wherein the phosphor is of formula $$SrF_2-SrS: Eu^{2+}, Dy^{3+}.$$

21. A lighting system according to claim 15, wherein the phosphor is of formula $$Sr_3Al_2O_5Cl_2: Eu^{2+}, Dy^{3+}.$$

22. A phosphor blend comprising a phosphor of formula I or II, dispersed in a polymer matrix;

$$M^1F_2-M^1S: Eu^{2+}, Ln^{3+} \quad (I)$$

$$M^2{}_3M^3{}_2O_5X_2: Eu^{2+}, Ln^{3+} \quad (II)$$

wherein
$M^1$ is Ba, Sr, Ca, Zn, Mg, or a combination thereof;
$M^2$ is Ba, Sr, Ca, Mg, Zn, or a combination thereof;
$M^3$ is Al, Ga, B, In, or a combination thereof;
X is F, Cl, Br, I, or a combination thereof; and
Ln is Dy, Yb, Tm, Er, Ho, Sm, Nd, or a combination thereof.

23. A phosphor blend according to claim 22, comprising a phosphor of formula I $$M^1F_2-M^1S: Eu^{2+}, Dy^{3+} \quad (I).$$

24. A phosphor blend according to claim 22, comprising a phosphor of formula II $$M^2{}_3M^3{}_2O_5X_2: Eu^{2+}, Dy^{3+} \quad (II).$$

25. A phosphor blend according to claim 22, comprising a phosphor of formula $$SrF_2-SrS: Eu^{2+}, Dy^{3+}.$$

26. A phosphor blend according to claim 22, comprising a phosphor of formula $$Sr_3Al_2O_5Cl_2: Eu^{2+}, Dy^{3+}.$$

* * * * *